United States Patent [19]

Moore et al.

[11] Patent Number: 4,954,303
[45] Date of Patent: Sep. 4, 1990

[54] APPARATUS AND PROCESS FOR DEVOLATILIZATION OF HIGH VISCOSITY POLYMERS

[75] Inventors: Eugene R. Moore; Tom E. Wessel, both of Midland, Mich.

[73] Assignee: The Dow Chemical Company, Midland, Mich.

[21] Appl. No.: 308,720

[22] Filed: Feb. 10, 1989

[51] Int. Cl.$^5$ .................. B29C 47/00; B29C 47/76
[52] U.S. Cl. .................... 264/101; 264/349; 264/DIG. 78; 366/75; 366/77; 366/85; 366/97; 366/139; 366/148; 366/190; 366/300; 366/330; 425/73; 425/203; 425/812; 425/DIG. 60; 528/501

[58] Field of Search ....... 264/101, 102, 349, DIG. 78; 425/73, 203, DIG. 60, 812; 528/484, 501; 366/75, 77, 83, 84, 85, 97, 139, 145, 148, 186, 190, 300, 330

[56] References Cited

U.S. PATENT DOCUMENTS

| | | | |
|---|---|---|---|
| 3,229,449 | 1/1966 | Hogue | 55/193 |
| 3,253,303 | 5/1966 | Bradt | 264/102 X |
| 3,409,712 | 11/1968 | Chisholm | 264/211.1 |
| 3,595,627 | 7/1971 | Abbott et al. | 366/186 X |
| 3,797,550 | 3/1974 | Latinen | 425/203 X |
| 3,826,477 | 7/1974 | Kunogi et al. | 425/203 X |
| 3,854,627 | 12/1974 | Coons | 366/84 X |
| 3,919,354 | 4/1975 | Moore et al. | 525/257 |
| 4,049,244 | 9/1977 | Hedrich | 366/143 |
| 4,125,208 | 11/1978 | Bettermann | 366/75 X |
| 4,128,516 | 12/1978 | Geschonke et al. | 523/318 |
| 4,132,845 | 11/1979 | Covington, Jr. et al. | 528/499 |
| 4,578,455 | 3/1986 | Pipper et al. | 528/501 |
| 4,699,976 | 10/1987 | Matsubara et al. | 528/501 |

FOREIGN PATENT DOCUMENTS

| | | | |
|---|---|---|---|
| 2518492 | 11/1976 | Fed. Rep. of Germany | 264/102 |
| 50-86555 | 7/1975 | Japan | 528/501 |
| 55-56104 | 4/1980 | Japan | 528/501 |

Primary Examiner—Jeffery Thurlow
Assistant Examiner—Leo B. Tentoni
Attorney, Agent, or Firm—Price, Heneveld, Cooper, DeWitt & Litton

[57] ABSTRACT

A devolatilizer, especially suitable for high viscosity polymers, comprising a vacuum chamber into the top of which the polymer is introduced after having passed through a tubular or equivalent heat exchanger, with a low shear mixer located in the vacuum chamber and a pumping device for removing the devolatilized polymer from the bottom of the vacuum chamber. Devolatilization of high viscosity polymers is achieved in this apparatus and method without severe degradation.

40 Claims, 1 Drawing Sheet

APPARATUS AND PROCESS FOR DEVOLATILIZATION OF HIGH VISCOSITY POLYMERS

BACKGROUND OF THE INVENTION

This invention relates to a method and apparatus for the devolatilization of synthetic resinous thermoplastic material.

It is well known that the removal of volatile constituents, such as water, solvents, unreacted monomers, low molecular weight polymers and inert gases, from polymer compositions is a necessary step in preparing and processing polymer compositions. A wide variety of devolatilization methods and apparatuses have been employed to remove volatile materials from thermoplastic resin compositions, including extrusion from an extruder having venting orifices, extrusion under vacuum, falling film devolatilizers and the like. One conventional devolatilizer consists of a boiling heat exchanger which is situated over a vacuum chamber and a gear pump or screw pump to expel the polymer from the bottom of the vacuum chamber.

In the past, it has been very difficult to devolatilize polymers in a continuous process without excessive time at high temperatures which can cause the polymer to degrade in color, molecular weight and overall physical properties. While the conventional type of devolatilizer described above does allow for clean and complete disengagement of vaporized monomer and solvent from the polymer, it does not always allow a useful undegraded polymer product to be recovered in a reasonable period of time.

A particularly troublesome polymer is a rubber-modified high impact interpolymer of styrene and maleic anhydride. When this polymer is devolatilized in a conventional devolatilizer, the polymer does not flow into the pump rapidly enough and the devolatilizer soon fills with polymer and must be shut down for cleaning. If the temperature is increased above about 260° C., the polymer will flow more rapidly but becomes severely degraded both in color and physical properties. In addition to a decrease in molecular weight of the rigid phase, the required "rubber" nature of the particles is lost.

Devolatilizing extruders have also been extensively tested and they have fewer problems with polymer breakdown since the mechanical action of the screw controls inventory time. Screw extruder devolatilizers equipped with venting orifices provide a large heat transfer surface wit good energy distribution and constantly expose fresh polymer surfaces. Due to the great amount of shearing involved, there is shear breakdown of the rigid phase molecular weight and reduction of the rubber particle size. While this can in some select cases still produce a polymeric product with acceptable properties, it does not, and cannot be made to, do an adequate job of disengagement of polymer and vapor. In spite of all efforts, vapor lines become fouled with accumulated polymer. This involves frequent shutdown for cleaning. This necessitates the shutting down of the entire polymerization line which takes about a day to restart and bring back to operating conditions. In addition, plugging of the vent orifices also can cause thermal decomposition and contamination of polymer. The installment of "on-line" sewer cleaning equipment reduces the problem of vacuum line plugging, but does not eliminate it.

SUMMARY OF THE INVENTION

The present invention is an apparatus for the devolatilization of high viscosity polymers which has a vertically disposed heat exchange means, a vertically disposed vacuum means in open communication with the heat exchange means and a discharge means in open communication with the lower end of the vacuum means, there being disposed between the vacuum means and the discharge means a low shear mixing means, preferably situated in close proximity to said discharge means.

The low shear mixer in the vacuum chamber and above the discharge means has been surprisingly found to substantially eliminate agglomeration of polymer near the inlet to the discharge means. Devolatilization of the molten polymer is surprisingly increased, possibly by the mixer increasing or renewing surface area of polymer which is exposed to the vacuum zone. By continuously feeding polymer to the discharge means, the residence time of the polymer in the devolatilizer is decreased enabling the devolatilizer to be operated at higher temperatures.

Surprisingly, notwithstanding the higher temperatures of devolatilization and the shorter residence time, the molten polymer is at least as well devolatilized at the shorter residence time as is the case with a longer residence time in a conventional devolatilizer. Despite the higher temperatures at which the devolatilization zone can be run, a polymer product having an improved color with less degradation of physical properties is obtained. A particular advantage afforded by the present invention is that by effecting a more rapid transport of polymer material through the devolatilization zone and out the discharge means, the temperatures within the vacuum zone can be 10° to 20° C. hotter to effect a more complete removal of volatile impurities without negatively affecting the color or physical properties of the product.

DETAILED DESCRIPTION OF THE PREFERRED EMBODIMENTS

Figure 1:
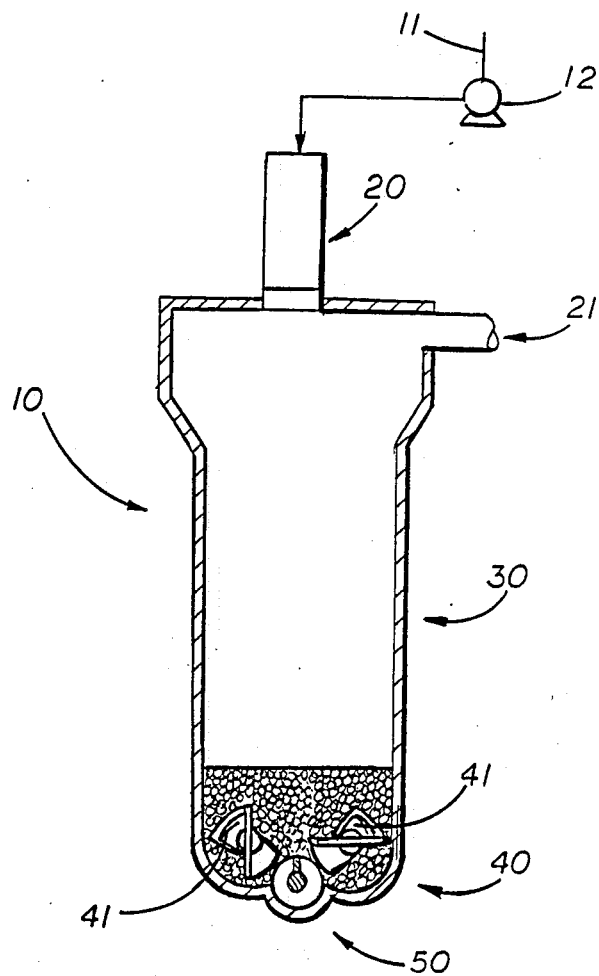
FIG. 1 schematically depicts the vertically arranged devolatilizer of the present invention.

FIG. 1 discloses a preferred embodiment of the instant invention suitable for use where a low volatiles content is required, comprising a single-stage flash devolatilization system. The devolatilization apparatus 10 comprises four general features, a heat exchange means 20, a vacuum zone 30, a low shear mixer 40 and a discharge means 50. The stream of volatile-containing polymeric material enters through line 11 and is conveyed by polymer gear pump or extruder 12 through the heat exchange means 20 where the temperature of the polymer is increased to at least a temperature above the softening point of the polymer but below a point where significant degradation occurs.

The specific temperature to which the feed polymer is heated will vary from polymer to polymer. For polystyrene and rubber-modified styrene copolymers, the polymer feed will be heated to a temperature within the range of from about 200° to 280° C., preferably from about 220° to 270° C. The speed of the material transfer means 12 or of the discharge means 50 is adjusted so as to maintain a substantially constant level of polymer in the vacuum zone.

The apparatus 10 is vertically oriented to facilitate gravity flow of material therethrough. The polymer feed is passed by the pumping action of the material transfer device 12 through the boiling heat exchange means 20 to vacuum chamber 30. Vacuum chamber 30 is maintained at a pressure which is sufficiently low to remove substantially all of the volatile constituents from the polymer feed. The pressure within the vacuum zone 30 will generally be maintained by a primary vacuum source, not shown, within the range of from about atmospheric pressure to approximately 2 millimeters, preferably from about 2 to 50 millimeters and most preferably from about 2 to 20 millimeters.

The volatile materials separated from the polymer material flowing through the vacuum zone are withdrawn by primary vacuum source, not shown, through line 21 and a condenser, not shown.

As a result of the elevated temperature of the polymer material and the reduced pressure in the vacuum zone 30, devolatilized polymeric material is produced which passes by gravity to the low shear mixer proximate the lower end of the vacuum zone where it is picked up by the low shear mixer and continuously forwarded to the discharge means, which withdraws the devolatilized polymer from the devolatilizer and forwards it to another work station, not shown, for further processing.

Heat exchange means 20 may be of any suitable construction well known to those skilled in the art. Conventionally, the heat exchanger will be of the jacketed, oil-heated type in order to maintain the temperature therein within the range of from about 200° to 280° C., and preferably within the range from 220° to 270° C. Preferably, the heat exchanger is a tubular or equivalent type which has a minimum pressure drop to allow rapid and complete vaporization of the volatile components during the travel through the exchanger.

Vacuum chamber 30 is also of conventional design and construction and includes at least one vacuum port for withdrawal of volatile constituents The volatile constituents which are withdrawn from the vacuum chamber are passed through vacuum line 21 and condensed in a condenser, not shown.

Mixer 40 is preferably a low shear device which is preferably operated at 2 rpm to 2,000 rpm, more preferably 2 rpm to 500 rpm, most preferably from 5 to 120 rpm. The mixer consists of two blades 41 with the blades being driven by gearing at either or both ends. Counter-rotating double-arm, that is, two blade, mixers with overlapping blades are especially preferred. The low shear mixer 40 is situated near the bottom or discharge end of the vacuum chamber 30 above discharge means 50 and below the vacuum ports. Agitator blades 41 are oriented horizontally on axes of rotation which are generally at right angles to the flow path of polymeric material through vacuum chamber 30. Preferably, blades 41 turn towards one another to force material between them as they rotate.

Mixer 40 has a size sufficient to be as large as vacuum chamber 30 and is adapted to urge devolatilized polymeric material to the discharge means at a rate sufficient to maintain the volume of polymeric material within said vacuum zone that whatever level is desired, varying from a level substantially equal to one-half of the vertical space defined by the enclosed area of the vacuum zone between the discharge of said preheater and said low shear mixing means to substantially the level of the bottom of the mixing device 41. Generally, it is preferred to maintain the level at a height about equal to the shafts on mixing device 41. This will generally maximize volatile removal with little polymer breakdown. Operation at higher levels is sometimes desired to allow a temporary decrease in removal rate while maintaining the same input rate. Operation at a lower level minimizes polymer breakdown.

Discharge means 50 can be any suitable device known to those skilled in the polymer art for transferring polymers and can include gear pumps, screw pumps or extruders.

The discharge means is adjusted so as to move devolatilized polymer from the vacuum zone at a rate substantially equal to the rate at which volatile-containing polymeric material is introduced into the heat exchange means. Buildup of polymer material in the vacuum chamber is substantially negated by the action of mixer 40 in forcing polymer into the discharge means opening at a rate sufficient to maintain an essentially constant level of polymer in the vacuum chamber.

Substantially any thermoplastic polymeric material which contains volatile impurities, such as unreacted monomer, low molecular weight oligomers and the like, can be successfully devolatilized in accordance with the inventive concepts of the invention. Accordingly, the invention is applicable not only to those polymers which are conventionally polymerized in mass form, but also to those polymers which require other processes for their preparation but which can be extruded in mass form.

By way of example, but not of limitation, the instant invention is suitable for use with polyolefin polymers and copolymers such as polyethylene, polypropylene, polybutylene; acrylate polymers and copolymers, such as polyacrylonitrile, polymethacrylate polymers, alkylmethacrylate polymers, vinyl halide polymers and copolymers, such as vinylchloride polymers, vinylidene chloride polymers; vinyl aromatic monomer polymers and copolymers, such as polystyrene, styrene-acrylonitrile copolymers, rubber-modified styrene polymers or copolymers, rubber-modified styrene acrylonitrile copolymers, styrene-rubber polymer-methacrylate-acrylonitrile polymer and rubber-modified styrene copolymers with maleic anhydride, phenyl maleimide or acrylates such as methyl methacrylate. This list would also include polycarbonates, polyurethanes, polyesters such as polyethyleneterephthalate, nylons, copolymers of styrene and diolefins such as isoprene or butadiene, particularly block copolymers and the like. The polymeric material most preferably comprises homopolymers and copolymers of vinyl aromatic monomers, such as polystyrene, rubber-modified polystyrenes, SAN copolymers, ABS copolymers, polymethacrylates and rubber-modified styrene methacrylate copolymers. Polystyrene, styrene copolymers and rubber-modified polystyrene or copolymers comprise the most preferred materials for devolatilization by the instant process. Rubbers used to modify or toughen the multipolymers may include those based on dienes such as butadiene or isoprene as well as those based on acrylates (such as butyl acrylate) or silicon or ethylene-propylene diene modified rubbers. The device is particularly valuable for higher temperature polymers and those with high rubber contents where viscosity is too high for normal devices.

EXAMPLE 1

Feed streams comprising a block copolymer of 70 weight percent butadiene and 30% styrene, styrene and maleic anhydride and a suitable solvent are polymerized in a polymerization train consisting of three reactors connected in series. Each of the reactors is equipped with a recirculation pump which removes material from the bottom or discharge of the reactor and recirculates the material to the top or inlet of the reactor. The product stream comprising grafted rubber, polymer and volatile constituents including unreacted monomers and low molecular weight polymer is passed to a continuous twin screw co-rotating, nonintermeshing extruder-like mechanical devolatilizer equipped with a vent orifice which is operated at 250° C. under an absolute pressure of 10 mm Hg, where the stream is continuously devolatilized at a rate of 617 g/hr. The graft rubber polymer extrudate was substantially completely devolatilized.

When the product stream from the third stage reactor is switched to the devolatilizing apparatus as disclosed in FIG. 1, wherein the discharge means comprises a screw pump, the product stream is substantially completely devolatilized even when the rate is increased to a rate in excess of 10 times the devolatilization rate of the mechanical devolatilizer. The polymer is found to suffer little degradation in properties when devolatilized in the FIG. 1 apparatus. The process employing the apparatus of FIG. 1 is able to operate for two months without problems, after which it is shut down and cleaned for inspection. At this time, the vacuum line is found to be clear except for a very thin film on the surface.

EXAMPLE 2

A 3½ inch twin screw extruder with co-rotating, nonintermeshing screws is employed to devolatilize a much larger stream of the graft rubber polymer of the previous example. The extruder has four vent ports with the vacuum controls on each to allow balancing of the vapor loads between stages. Each vent port is equipped with a small, counter-rotating twin screw pump designed to return much of the entrained polymer to the main extruder, thus lowering the amount of entrained polymer entering the vacuum line. Initially, the vacuum must be balanced, so that approximately equal vapor velocity comes from each port, with somewhat higher velocity as one progresses to lower vacuums down the extruder. Primarily, it is necessary to start from the first or rear extruder zone and in turn adjust the pressure, while observing through the glass port, downward until foaming rises and approaches the vacuum line. The pressure is then decreased slightly so the foam recedes. This represents about the maximum vapor rate that can be used in any given port. Even when this is done, within four days the vacuum lines have accumulated so much polymer that the entire operation must be shut down for cleaning.

EXAMPLE 3

The graft rubber polymer of Example 1 is devolatilized employing an apparatus such as disclosed in FIG. 1, except that a color concentrate containing black pigment in styrene-acrylonitrile copolymer is added just above the agitator. Care is taken to maintain the polymer level slightly above the agitator blades. It is seen that in addition to doing a good job of devolatilizing without excessive loss of polymer properties and vacuum line plugging that the pigment is well distributed throughout the product.

EXAMPLE 4

Example 3 is repeated except that a low volatility mineral oil is pumped into the devolatilizer in place of pigment concentrate. Equivalent results are obtained.

EXAMPLE 5

Example 3 is repeated except an ABS resin is used in place of the styrene/maleic anhydride graft rubber blend. Equivalent results are obtained.

EXAMPLE 6

Example 3 is repeated except a styrene acrylonitrile resin is devolatilized. Equivalent results are obtained.

EXAMPLE 7

Example 6 is repeated except a predispersed grafted rubber concentrate is extruded into the mixer so that the total rubber content is 20%. The properties of the resulting ABS resin are the same as though the predispersed grafted rubber concentrate had been added by separate extrusion operation.

The embodiments of the invention in which an exclusive property or privilege is claimed are defined as follows:

1. An apparatus for devolatilizing polymeric materials containing volatile constituents comprising, in combination:
    a vertically disposed heating zone, said heating zone having an inlet means for receiving a stream of polymeric material, means for heating polymeric material within said zone and an outlet means for discharging polymer from said heating zone;
    a vertically disposed vacuum zone having an upper half and a bottom half, the upper half of said vacuum zone being in open communication with said heating zone and being adapted to receive heated polymer from said heating zone, said upper half of said vacuum zone having a means for withdrawing volatile constituents from said vacuum zone;
    a vertically disposed low shear mixing means located in the bottom half of said vacuum zone and being adapted to receive and agitate polymeric material within said vacuum zone; and
    a vertically disposed discharge means, said discharge means being in open communication with said low shear mixing means and being adapted to receive devolatilized polymeric material from said low shear mixing means and to discharge devolatilized material from said apparatus.

2. An apparatus in accordance with claim 1, wherein said low shear mixing means is adapted to receive an amount of polymeric material substantially equal to the amount of polymeric material introduced into said vacuum zone and being further adapted to urge polymeric material towards said discharge means at a rate sufficient to maintain an amount of polymeric material within said vacuum zone at a level substantially equal to one-half the volume of said vacuum zone.

3. An apparatus in accordance with claim 2 wherein said low shear mixing means comprises a pair of agitator blades.

4. An apparatus in accordance with claim 3 wherein said low shear mixing means comprises sigma blades.

5. An apparatus in accordance with claim 4 wherein said low shear mixing blades rotate at from about 2 to about 2,000 rpm.

6. An apparatus in accordance with claim 4 wherein said low shear mixing blades rotate at from about 5 to about 120 rpm.

7. An apparatus in accordance with claim 1 wherein said low shear mixing means is located near the bottom of said vacuum zone.

8. An apparatus in accordance with claim 1 wherein said low shear mixing means comprises a pair of agitator blades.

9. An apparatus in accordance with claim 8 wherein said low shear mixing means comprises sigma blades.

10. An apparatus in accordance with claim 9 wherein said low shear mixing blades rotate at from about 2 to about 2,000 rpm.

11. An apparatus in accordance with claim 9 wherein said low shear mixing blades rotate at from about 5 to about 120 rpm.

12. An apparatus in accordance with claim 1 wherein said low shear mixing means comprises a pair of agitator blades.

13. An apparatus in accordance with claim 12 wherein said low shear mixing means comprises sigma blades.

14. An apparatus in accordance with claim 13 wherein said low shear mixing blades rotate at from about 2 to about 2,000 rpm.

15. An apparatus in accordance with claim 13 wherein said low shear mixing blades rotate at from about 5 to about 120 rpm.

16. An apparatus in accordance with claim 1 wherein said mixing means comprises a pair of agitator blades oriented generally horizontally on axes of rotation which are generally transverse to the path of polymeric material through said vacuum zone.

17. An apparatus in accordance with 16 wherein said blades rotate towards one another.

18. An apparatus in accordance with claim 17 wherein said low shear mixing means comprises sigma blades.

19. An apparatus in accordance with claim 18 wherein said low shear mixing blades rotate at from about 2 to about 2,000 rpm.

20. An apparatus in accordance with claim 18 wherein said low shear mixing blades rotate at from about 5 to about 120 rpm.

21. A method for devolatilizing polymeric material containing volatile constituents comprising:
  introducing a stream of polymeric material containing volatile impurities into a vertically disposed heating zone;
  raising the temperature of said stream of polymeric material during its residence in said heating zone;
  gravitationally passing said heated stream of polymeric material to a vertically disposed vacuum zone having an upper half and a lower half, and including a volatile constituent withdrawal means located in said upper half of said vacuum zone for withdrawing volatile constituents from said vacuum zone and a vertically disposed low shear mixing means located in said bottom half of said vacuum zone and mixing under conditions of low shear said polymeric material in said vacuum zone to separate volatile constituents from said polymeric material during its residence in said devolatilizing zone;
  withdrawing separated volatile constituents from said vacuum zone through said volatile constituent withdrawal means; and
  discharging said devolatilized polymeric material from said vacuum zone.

22. The method of claim 21 which includes passing polymeric material, which passes through said vacuum zone, through said mixing means and using said mixing means to urge said polymeric material towards a discharge opening in said vacuum means.

23. The method of claim 22 wherein said mixing means comprises a pair of agitator blades.

24. The method of claim 23 wherein said agitator blades comprise sigma blades.

25. The method of claim 24 wherein said blades are rotated at from about 2 to about 2,000 rpm.

26. The method of claim 24 wherein said blades are rotated at from about 5 to about 120 rpm.

27. The method of claim 21 which includes passing said polymeric material to said mixing means before discharging said polymeric material from said vacuum zone.

28. The method of claim 27 wherein said mixing means comprises a pair of agitator blades.

29. The method of claim 28 wherein said agitator blades comprise sigma blades.

30. The method of claim 29 wherein said blades are rotated at from about 2 to about 2,000 rpm.

31. The method of claim 29 wherein said blades are rotated at from about 5 to about 120 rpm.

32. The method of claim 21 wherein said mixing means comprise a pair of agitator blades.

33. The method of claim 32 wherein said agitator blades comprise sigma blades.

34. The method of claim 33 wherein said blades are rotated from about 2 to about 2,000 rpm.

35. The method of claim 33 wherein said blades are rotated at from about 5 to about 120 rpm.

36. The method of claim 21 wherein said mixing means comprises a pair of agitator blades oriented generally horizontally on axes of rotation which are generally transverse to the flow of polymeric material through said vacuum zone.

37. The method of claim 36 wherein said blades are rotated toward one another.

38. The method of claim 37 wherein said agitator blades comprise sigma blades.

39. The method of claim 38 wherein said blades are rotated at from about 2 to about 2,000 rpm.

40. The method of claim 38 wherein said blades are rotated at from about 5 to about 120 rpm.

* * * * *